United States Patent [19]

Frankland, Jr.

[11] Patent Number: 4,639,143

[45] Date of Patent: Jan. 27, 1987

[54] EXTRUSION SCREW

[75] Inventor: James D. Frankland, Jr., New Castle, Pa.

[73] Assignee: New Castle Industries, Inc., New Castle, Pa.

[21] Appl. No.: 706,405

[22] Filed: Feb. 28, 1985

[51] Int. Cl.$^4$ .............................. B01F 7/08; B29B 1/06
[52] U.S. Cl. .................................... 366/89; 366/90; 366/322; 366/323
[58] Field of Search ..................... 366/79, 81, 87–90, 366/318, 319, 322–324; 425/206, 208, 378 R

[56] References Cited

U.S. PATENT DOCUMENTS

| | | | |
|---|---|---|---|
| 3,006,029 | 10/1961 | Saxton | 366/90 |
| 3,375,549 | 4/1968 | Geyer | 366/90 X |
| 3,788,614 | 1/1974 | Gregory | 366/87 X |
| 3,957,256 | 5/1976 | Murakami | 366/81 |
| 4,052,038 | 10/1977 | Brand | 366/90 |
| 4,136,969 | 1/1979 | Meyer | 366/90 |
| 4,227,870 | 10/1980 | Kim | 366/87 X |

Primary Examiner—Timothy F. Simone
Attorney, Agent, or Firm—Robert D. Yeager; Christine R. Ethridge; George D. Dickos

[57] ABSTRACT

An extruder of the variety including a body having a cylindrical bore therethrough, and a shaft rotatably supported within the bore. The shaft includes at least a first helical flight means defining a main channel. The shaft is divided along its length into a feed section, an intermediate melt section, and at least one metering section. A portion is included in one of the sections which has a plurality of discrete grooves arranged in a discontinuous helix cut into the main channel. There is preferably a plurality of staggered rows of grooves within the main channel, the axis of each row being substantially parallel to the helical axis of the adjacent first helical flight means. The grooves are adapted to so receive the material forced through the extruder that the average shear force exerted against the material, and thus, the average temperature of the material, is reduced while the output of the material is maintained at a predetermined level.

11 Claims, 5 Drawing Figures

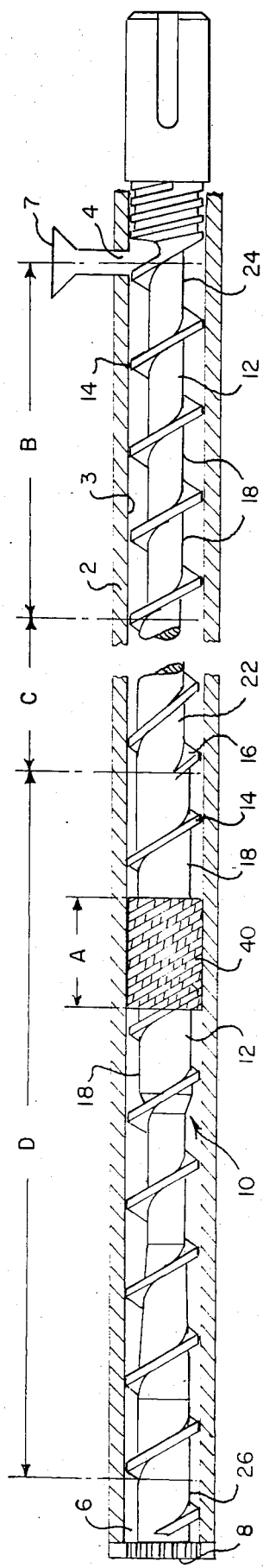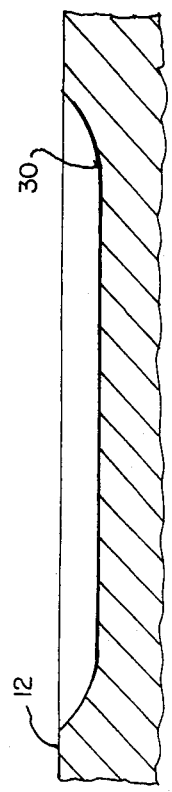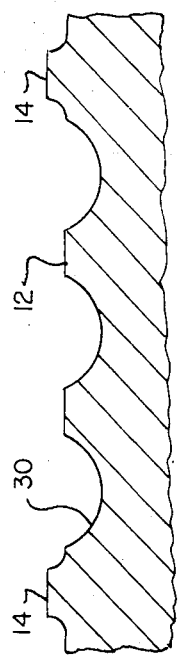

EXTRUSION SCREW

BACKGROUND OF THE INVENTION

1. Field of the Invention

The present invention relates to plasticating screws, and more particularly, to an improved mixing section for a plasticating screw.

2. Description of the Prior Art

The screw extrusion process involves feeding a solid, particulate polymeric material into the hopper of an extruder, or injection molding machine and then through a zone where the solid polymer is melted, or plasticized, into a viscous phase then forced into a die or mold of a desired configuration. The polymer is continuously propelled along a screw in a cylindrical bore through regions of high temperature and pressure.

One of the most important features of plasticating extruders is the screw. It is responsible for forwarding, melting, pressurizing and homogenizing the material from the feed hopper to the mold or die. The screw is typically divided into three major sections: the feed section which picks up the material from the hopper and propels it forward; the transition, or melt section, which melts the material; and the metering section which contributes to the uniform flow of the melted material at a sufficient pressure to force the material into the mold or die. Often, polymer not adequately melted in the transition section will melt somewhat more in the metering section.

Incomplete melting of the polymer results in a poor quality extrudate containing entrapped solid particles. Geyer U.S. Pat. No. 3,375,549 (the Geyer Patent), which issued on Apr. 2, 1968, discloses a screw having two channels, a solid channel and a melt channel, which continuously separate the viscous material from the solid material. The depth of each channel varies to permit the viscous material to pass forward while exerting pressure on the solid material to melt it.

Dray et al. U.S. Pat. No. 3,650,652 (the Dray Patent), issued on Mar. 21, 1972. The Dray Patent, like the Geyer Patent discussed above, discloses a screw having a first flight defining a main helical channel that extends through the length of the screw. A second flight begins downstream from the first flight at about the beginning of the transition section. Together, the first and second flights define an auxiliary helical channel. The second flight ends at about the beginning of the metering section. As the polymer melts, it passes from the main channel to the auxiliary channel. The melted polymer from each channel is combined in the metering section.

In addition to mixing and conveying, the metering section of plasticating screws provides the necessary pressure to force the extrudate into the mold or die. The rotation of the screw, in most applications less than 150 RPM, but in some up to 500 RPM, provides mechanical energy which is imparted to the polymer in the form of a shearing force. The application of shear is converted to thermal energy, resulting in a temperature rise in the polymer. Thus, the higher the shear, the higher the temperature.

In the metering section, the shear is often at its maximum level, thus, the average temperature of the polymer is raised. While the higher shear rates provide better mixing, the higher temperature can either deteriorate the polymers or cause processing problems downstream of the screw.

Kruder U.S. Pat. Nos. 3,870,284; 4,015,832; 4,173,417; and 4,277,182 disclose variations of a multichannel wave screw. Each flow channel is characterized by an undulating screw root which defines a plurality of crests and valleys. Solid material passes over the crests, thereby maximizing the melting of that material. Melted material passes with minimal additional shear. The polymer is thus uniformly mixed and melted without increasing the average temperature of the polymer.

A wide variety of extrusion screws of different designs have been developed to address specific problems in providing a satisfactory extrudate. Gregory U.S. Pat. No. 3,788,614 discloses an extrusion screw having an intermediate section of increased diameter. A plurality of concave channels of uniform depth are provided in the intermediate section in an interlocking helical arrangement.

Saxton U.S. Pat. No. 3,006,029 discloses a screw having a major helical channel defined by a helical arrangement of minor flights and minor channels. The minor channels form grooved passages between adjacent sections of the major channel. The channels are supposed to prevent the overheating and subsequent degradation of the plastic.

Brand U.S. Pat. No. 4,052,038 and Maillefer U.S. Pat. No. 4,085,461 disclose grooved passages in the mixing and melt sections, respectively, of extrusion screws. The passages are designed to decrease the temperature of the plastic to prevent degradation.

The object of the present invention is to provide a plasticating screw having an improved mixing portion which will uniformly mix the polymer, eliminate residual unmelted polymer and discharge it with the desired amount of pressure while permitting greater temperature control to avoid the degradation or overheating of the polymer.

SUMMARY OF THE INVENTION

The present invention provides an improvement in plasticating screws. In an extruder of the variety which includes a body having a bore therethrough and an inlet and an outlet at opposite ends of the bore, and a shaft rotatably supported within the bore, the shaft having at least one helical flight means extending along its length and defining a helical channel for conveying a material from the inlet towards the outlet upon rotation of the shaft to change the material from a solid phase to a viscous phase, the shaft being divided along its length at least into a feed section adjacent to the inlet, an intermediate melt section and a metering section adjacent to the outlet, the improvement includes a portion in at least one of the sections having a plurality of discrete grooves arranged in a discontinuous helix cut into the channel. The plurality of grooves are dimensioned to so receive the material therein as the material is conveyed through the channel to the outlet that an average shear force is imparted to the material to reduce the temperature of the material while maintaining the output of the material at a predetermined rate.

There may be a plurality of staggered helical rows of grooves cut into the channel. The helical axis of each row is substantially parallel to the helical axis of the helical flight means. The longitudinal axis of each groove preferably lies along the helical axis of its row.

The transverse cross section of each groove is preferably semicircular and the longitudinal cross section is preferably semielliptical. The root diameter of the shaft at the portion is either constant or tapered.

In the preferred embodiment the shaft includes first and second helical flight means defining a main channel which extends the length of the shaft and an auxiliary channel which extends the length of the intermediate melt section. The diameter of the shaft may vary along its length. However, the improved mixing portion may be used with any suitable shaft design to provide the advantages of the present invention.

BRIEF DESCRIPTION OF THE DRAWINGS

The following detailed description of the preferred embodiment can be better understood if reference is made to the attached drawings in which:

FIG. 1 is a foreshortened elevational view of an extrusion screw showing the area, designated A, of the improved portion of the present invention;

FIG. 4 is a fragmentary section view of the improved portion taken along the line IV—IV of FIG. 3; and FIG. 5 is a fragmentary section view of the improved portion taken along the line V—V of FIG. 3.

DETAILED DESCRIPTION OF THE PREFERRED EMBODIMENT

Figure 2:
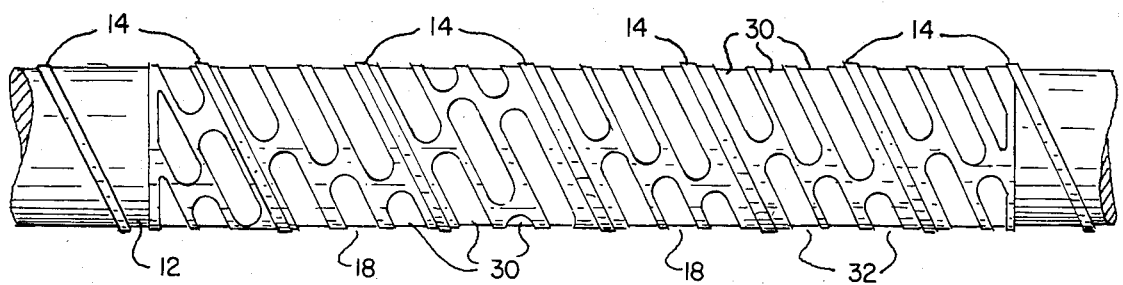
FIG. 2 is an enlarged detail view of the area A of FIG. 1.

FIGS. 1 through 5 illustrate the preferred embodiment of the improved portion of a plasticating screw 10.

For purposes of description, the plasticating screw 10, shown in a foreshortened version in FIG. 1, is adapted for use in a conventional extruder. The extruder is one of the variety which includes a body 2 having a cylindrical bore 3 therethrough. The body includes an inlet 4 and an outlet 6 at opposite ends of the bore. A feed hopper 7 is provided at the inlet and a die or mold 8 is positioned at the outlet. The screw 10 is supported within the bore for rotation by any suitable power means. The screw 10 rotates in the closely fitted cylindrical bore. It is common practice to heat the bore to assist melting of the solid polymer which is fed into the inlet end through the feed hopper. The polymer melts as it is conveyed by the rotation of the screw through the bore towards the outlet and into the die or mold. A typical extruder is shown diagrammatically in F. BILLMEYER, TEXTBOOK OF POLYMER SCIENCE (1962).

Referring to FIG. 1, the screw 10 is divided along its length into at least three sections, the feed section B, the intermediate melt section, or transition section C and the metering section D. A decompression area as described in Frankland U.S. Pat. No. 4,240,755 which issued on Dec. 23, 1980, may also be provided in screw 10 in appropriate applications. The improved portion is designated as area A. Depending on the particular application, the improved mixing portion A can be placed anywhere along the length of the screw 10. The most usual applications will benefit by the placement of portion A in either the melt section C or the metering section D. In some applications, the screw may have a second metering section. There is often a vent disposed between the two metering sections in the body of the extruder so that any undesirable matter within the material may volatize. Additives may also be added through the vent. In the embodiment of the extrusion screw 10 having two metering sections, the portion A is preferably positioned in the first metering section before the vent. If additives are to be added through the vent however, the portion A is preferably placed in the second metering section between the vent and the outlet. The improved portion A may alternatively be placed in both metering sections or, may extend into adjoining sections of screw 10.

The screw 10 includes a shaft 12 which extends from inlet end 24 to outlet end 26. A first helical flight 14 protrudes from shaft 12. A second helical flight 16, shown only in part in melt section C in FIG. 1, may also be provided. The first flight 14 defines a main channel 18 that extends along the entire length of the screw 10. In a screw 10 having first and second helical flights, an auxiliary channel 22 is defined by the first and second flights, 14 and 16, respectively and may extend along the length of the melt section C. Only a portion of the auxiliary channel 22 is shown in melt section C in FIG. 1.

Apart from the improved portion A, the screw 10 can have any suitable design. A single flight screw will suffice. Numerous screw designs are known in the art. A preferred design is that shown by the Dray Patent, U.S. Pat. No. 3,650,652, discussed previously. To the extent that the Dray Patent discloses the arrangement and relationship between the first and second helical flight, or land means, 14 and 16, the main and auxiliary channels, 18 and 22, and the movement of plastic material through the feed and melt sections, B and C, it is incorporated herein by reference. Another suitable screw design is shown by the Geyer Patent, U.S. Pat. No. 3,375,549, also discussed hereinabove.

Figure 3:
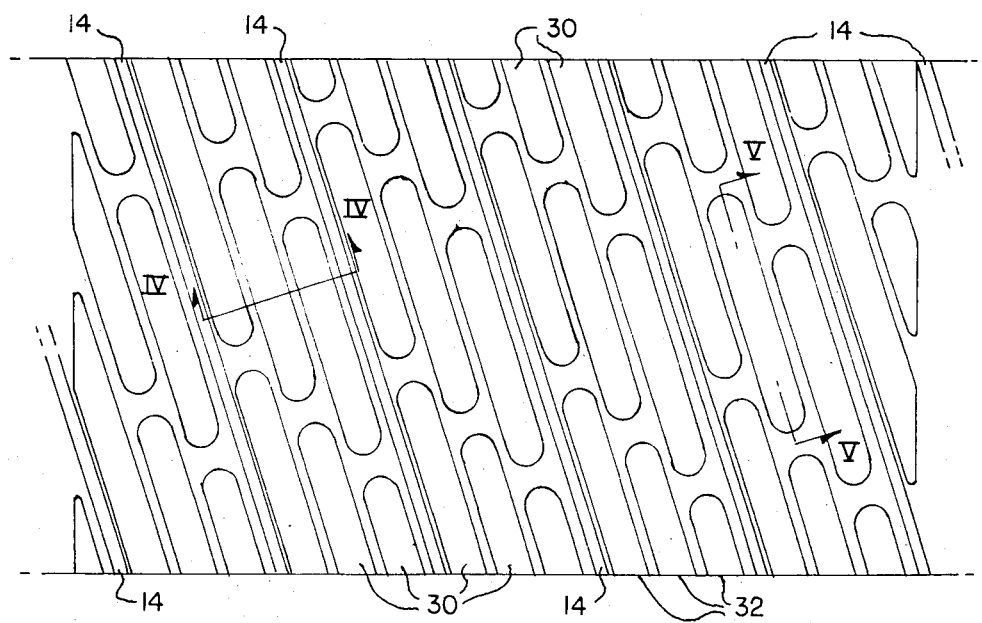
FIG. 3 is a development of the layout of the grooves and helical flights of the area A.

The improved portion A is shown in detail in FIGS. 2 through 5. A plurality of discrete grooves 30 are arranged in a discontinuous helix cut into the surface 40 of shaft 12 in main channel 18. There are preferably a plurality of helical rows 32 of grooves 30 depending on the level of average shear and mixing required. Three such rows 32 are shown between each turn of the first helical flight 14 in the main channel 18. The helical axis of each row 32 is substantially parallel to the helical axis of the first flight 14 defining main channel 18. The rows 32 of grooves 30 are preferably staggered, as shown in FIGS. 2 and 3.

Referring to FIGS. 4 and 5, the transverse cross section of each groove 30 is preferably a semicircle and the longitudinal cross section is preferably semielliptical. The longitudinal axis of each groove 30 is parallel to the helical axis of the first helical flight 14 and preferably coaxial to the helical axis of each row 32.

The root diameter of shaft 12 in portion A is continuous, as shown in FIGS. 1 and 2, but may be tapered. As shown in FIG. 1 and described in the Dray Patent referenced herein, the diameter of shaft 12 varies along its length.

In operation solid plastic material, preferably a polymer, is fed in pellet, granular or powder form into the feed hopper of an extruder. The solid material is conveyed at an optimum rate from inlet end 24 toward outlet end 26 by the rotation of extrusion screw 10 within the bore of the extruder body. The first flight 14 pushes the solid polymer forward along the main channel 18. As the material progresses through the extruder into the intermediate melt section C, it is subjected to compression and shear. The mechanical energy imparted to the material in this manner, together with the optional application of external heat from the body of the extruder, causes the temperature of the material to rise. The diameter of the shaft 12 preferably increases in main channel 18 through melt section C, with a corresponding progressive decrease in the depth of the channel 18. The steady reduction of the channel depth increases the compression and shear forces exerted against the material. The temperature of the material increases to the point at which the material changes from a solid phase to a viscous or plasticized phase. Generally, most of the material is melted in the intermediate melt section C.

The diameter of shaft 12 becomes uniform at the transition between melt section C and metering section D. The viscous material flows through main channel 18 in metering section D.

The final metering section in a conventional plasticizing screw would mark the end of the screw. The pumping action of the metering section in such a screw would serve to regulate the flow of melted polymer through a die or other exit configuration located downstream of the end of the screw.

The objective of the extrusion operation is to provide a homogeneous mass of melted polymer at a desired uniform temperature. With conventional screws, all of the mixing of the polymer and most of the heat application must be accomplished by intensively subjecting the polymer to the mechanical action of shear and compression within the three sections provided in such screws, especially within the transition and metering sections. Experience has shown that heat sensitive polymers may thermally degrade under such conditions or the polymers may be heated to a temperature that can adversely effect the subsequent processing of the polymer.

The rotation of the screw must be maintained at a predetermined rate to discharge the viscous material with sufficient output and pressure. The necessary rotation speed may result in excessive shear stress that may overheat the polymer. The present invention provides an improved mixing portion which will uniformly mix the material and discharge it at the desired output and pressure while improving control of the temperature. In addition, the improved portion will eliminate any residual solid in the viscous phase.

The viscous material and any remaining solid material pass over portion A. The elevation of portion A is sufficient to provide the high shear necessary to mix the material and to melt any remaining unmelted material.

In a conventional single channel screw, the polymer is mixed to a limited extent by the shear forces. The flow, however, can be largely laminar. In a screw including the portion A of the present invention, the viscous material passes down the helical path by flowing from groove 30 to groove 30 in a random fashion greatly enhancing mixing. As the material flows over surface 40 of portion A it receives proportionately higher shear than it receives in the grooves 30. The higher shear further redistributes and mixes the material. The unmelted solids are subjected to intermittent periods of high shear when flowing over surface 40 and to a lower shear when flowing through grooves 30. The resulting alternating levels of shear provide optimum melting conditions for the residual solid material by forcing the solid to break up while allowing the transfer of heat by conduction to the solid from the surrounding melt. The net effect of the improved portion A is improved mixing, a lower average material temperature, the substantial and preferably total elimination of unmelted solid and the maintenance of output at a predetermined rate, depending on the application. The average shear force imparted to the material is reduced, and consequently, the average temperature of the material is maintained below the temperature level of material processed in a conventional screw.

The discontinuous arrangement of the grooves 30 forces the viscous material intermittently onto surface 40 in portion A so that the material is uniformly mixed and discharged at a uniform flow rate. The rate of discharge depends on the particular application and may vary accordingly. The present invention permits the desired, predetermined rate to be maintained without the accompanying temperature rise heretofore experienced. The cross-sectional shape of the grooves 30 enhances the flow of the viscous material into and out of the grooves.

What is claimed is:

1. In an extruder of the variety including a body having a bore, said body having an inlet and an outlet adjacent opposite ends of said bore, a shaft rotatably supported in said bore, at least one helical flight means on said shaft extending along its length and defining a helical channel for conveying a material from said inlet toward said outlet upon rotation of said shaft wherein said material is changed from a solid phase to a viscous phase, said shaft including along its length at least a feed section adjacent said inlet, an intermediate melt section, and a metering section adjacent said outlet, the improvement comprising:

a longitudinal portion in at least one of said sections having a plurality of discrete closed-ended grooves arranged in a discontinuous helix cut into said channel, said plurality of grooves being dimensioned to so receive said material therein as said material is conveyed through said channel to said outlet that an average shear force is imparted to said material to reduce the temperature of said material while maintaining the output of said material at a predetermined rate.

2. The improvement as recited in claim 1 wherein the longitudinal axis of each of said grooves is substantially parallel to said helical flight means.

3. The improvement as recited in claim 1 wherein the transverse cross section of each said groove is semicircular and the longitudinal cross section of each said groove is semielliptical.

4. The improvement as recited in claim 1 wherein there is a plurality of helical rows of said grooves cut into said channel, the helical axis of each said row being substantially parallel to the helical axis of said helical flight means.

5. The improvement recited in claim 4 wherein the root diameter of said shaft at said portion is constant.

6. The improvement recited in claim 4 wherein the root diameter of said shaft at said portion is tapered.

7. The improvement as recited in claim 4 wherein there are three staggered helical rows of said grooves.

8. An extruder comprising:

a body defining a cylindrical bore, said body having an inlet and an outlet adjacent opposite ends of said bore;

a shaft rotatably supported within said bore, said shift being divided along its length in the direction from said inlet to said outlet into a feed section, an intermediate melt section and at least one metering section;

first helical flight means on said shaft extending along its length and defining a main channel;

said first helical flight means being so dimensioned relative to said shaft and said bore that material is forced from said inlet towards said outlet upon rotation of said shaft, said material being changed from a solid phase to a viscous phase; and a longitudinal portion of said metering section having a plurality of descrete closed-ended grooves arranged in a discountinuous helix cut into said main channel, said grooves being surrounded and separated from each other by elevated areas of high shear, said plurality of grooves being so arranged that said material must flow intermittently over said elevated areas of high shear and into said grooves, said intermittent flow permitting an average shear force to be exerted against said material to reduce the temperature of said material while maintaining the output of said material at a predetermined rate.

9. An extruder as recited in claim 8 wherein there is a plurality of staggered helical rows of said grooves cut into said main channel, the helical axis of each of said rows being substantially parallel to the helical axis of said first helical flight means in said metering section; and each said groove has a semiconductor transverse cross section and a semielliptical longitudinal cross section.

10. An extruder as recited in claim 8 wherein said shaft has two metering sections and said body includes a vent disposed between said metering sections, said portion being positioned on at least one of said metering sections.

11. An extruder as recited in claim 8 further comprising a second helical flight means branching from said first helical flight means and extending along the length of said intermediate melt section, said first and second helical flight means defining an auxiliary channel, said first and second helical flight means being so dimensioned relative to said shaft and said bore that material is forced from said inlet towards said outlet upon rotation of said shaft, said material being changed from a solid phase to a viscous phase.

* * * * *

UNITED STATES PATENT AND TRADEMARK OFFICE
CERTIFICATE OF CORRECTION

PATENT NO. : 4,639,143

DATED : January 27, 1987

INVENTOR(S) : James D. Frankland, Jr.

It is certified that error appears in the above—identified patent and that said Letters Patent is hereby corrected as shown below:

Col. 6, line 59, delete "shift" and substitute therefor --shaft--.

Col. 7, line 4, delete "descrete" and substitute therefor --discrete--.

Col. 7, line 5, delete "discountinuous" and substitute therefor --discontinuous--.

Col. 8, line 3, delete "semiconductor" and substitute therefor --semicircular--.

Signed and Sealed this

Twenty-fifth Day of August, 1987

Attest:

DONALD J. QUIGG

Attesting Officer     Commissioner of Patents and Trademarks